US009411856B1

(12) United States Patent (10) Patent No.: US 9,411,856 B1
Stevens (45) Date of Patent: Aug. 9, 2016

(54) OVERLAY GENERATION FOR SHARING A WEBSITE

(71) Applicant: Google Inc., Mountain View, CA (US)

(72) Inventor: Adam Stevens, Dublin (IE)

(73) Assignee: Google Inc., Mountain View, CA (US)

(*) Notice: Subject to any disclaimer, the term of this patent is extended or adjusted under 35 U.S.C. 154(b) by 967 days.

(21) Appl. No.: 13/632,284

(22) Filed: Oct. 1, 2012

(51) Int. Cl.
*G06F 17/30* (2006.01)
*G06F 3/0484* (2013.01)

(52) U.S. Cl.
CPC ........ *G06F 17/30522* (2013.01); *G06F 3/0484* (2013.01); *G06F 17/30861* (2013.01)

(58) Field of Classification Search
CPC . G06F 3/0484; G06F 17/3053; G06F 9/4451; G06F 17/30525; G06F 17/30861; G06F 17/30867
See application file for complete search history.

(56) References Cited

U.S. PATENT DOCUMENTS

| | | | | |
|---|---|---|---|---|
| 8,606,792 B1* | 12/2013 | Jackson | G06F 17/30699 | 707/748 |
| 8,793,255 B1* | 7/2014 | Bilinski | G06F 17/30867 | 707/740 |
| 8,990,193 B1* | 3/2015 | Reynar | G06F 17/30867 | 707/726 |
| 2002/0054084 A1* | 5/2002 | Udell | G06F 17/30899 | 715/738 |
| 2005/0256866 A1* | 11/2005 | Lu | G06F 17/30867 | |
| 2007/0192130 A1* | 8/2007 | Sandhu | G06Q 10/1053 | 705/321 |
| 2007/0208613 A1* | 9/2007 | Backer | G06Q 10/107 | 715/234 |
| 2008/0005223 A1* | 1/2008 | Flake | G06F 17/30864 | 709/203 |
| 2009/0030940 A1* | 1/2009 | Brezina | H04M 15/00 | |
| 2009/0144272 A1* | 6/2009 | Adarsh | G06F 17/30864 | |
| 2009/0217196 A1* | 8/2009 | Neff | G06Q 10/10 | 715/799 |
| 2009/0265607 A1* | 10/2009 | Raz | G06F 17/2288 | 715/233 |
| 2009/0282002 A1* | 11/2009 | Reeder | G06Q 30/02 | |
| 2009/0299824 A1* | 12/2009 | Barnes, Jr. | G06F 3/04847 | 705/7.39 |
| 2010/0042928 A1* | 2/2010 | Rinearson | G06F 15/177 | 715/737 |
| 2011/0040787 A1* | 2/2011 | Cierniak | G06F 17/30312 | 707/770 |
| 2011/0041075 A1* | 2/2011 | Cierniak | G06Q 30/02 | 715/745 |
| 2011/0145219 A1* | 6/2011 | Cierniak | G06F 17/30867 | 707/709 |
| 2011/0264736 A1* | 10/2011 | Zuckerberg | G06Q 30/02 | 709/204 |
| 2012/0150997 A1* | 6/2012 | McClements, IV | G06Q 10/101 | 709/217 |
| 2013/0036112 A1* | 2/2013 | Poon | G06Q 50/01 | 707/723 |
| 2013/0041898 A1* | 2/2013 | Ishida | G06F 17/3089 | 707/736 |
| 2013/0159402 A1* | 6/2013 | Liensberger | G06Q 10/00 | 709/204 |
| 2013/0204833 A1* | 8/2013 | Pang | G06Q 30/02 | 706/52 |

* cited by examiner

*Primary Examiner* — Andrea Long
(74) *Attorney, Agent, or Firm* — Patent Law Works LLP

(57) ABSTRACT

A system and method for generating an overlay to share information on a website among users who are associated with a social network. A sharing application includes a social network engine, a code generator, a rating engine, a filter module, a dialog engine, a website annotator, a recommendation engine and a user interface module. The social network engine registers users with the social network to share information on websites. The social network engine generates user profiles for users including topics that the users are interested in. The rating engine rates the users based at least in part on the user's activities relating to the websites. The filter module filters users that are included in the overlay according to conditions. The dialog engine generates dialog boxes for users to communicate with each other. The user interface module generates the overlay.

17 Claims, 11 Drawing Sheets

Figure 3

Figure 7 http://www.informationalwebsite.com/windpower

Login / Create account

Search

| Article | Discussion | | Read | Edit | View history |

Wind power

Wind power is the conversion of useful form of energy, such as using make electricity, windmills for me windpumps for water pumping or

Contents [hide]

1 History
2 Wind energy
  2.1 Distribution of wind speed
3 Wind farms
4 Wind power usage
  4.1 Growth trends
5 Offshore wind power
6 Electricity generation
  6.1 Grid management
  6.2 Capacity factor
  6.3 Penetration
  6.4 Variability and intermittency
  6.5 Capacity credit and fuel Main page
Contents
Featured content
Current events
Random article ▶ Interaction
  Help
  ...
  Recent Change ▼ Toolbox
  What links here
  Related changes
  Upload file ▲ Print/export

John W.
97% Page Rating
98% Overall Rating me
Wind power is essential for the future!    4:35 PM

John W.
I agree, but have you considered the noise? 4:36 PM me
What a GREAT point    4:37 PM Settings — 708

— 706

| Related | Video (5) ▲ | Vertical Axis Wind Turbine Windmill | News (3) ▲ | Clean power's new best friend the humble hot water |

We
Sh

▽ Rate Me!
○ Add to Groups
◇ Annotations — 710
👤 Profile
☐ Options

OVERLAY GENERATION FOR SHARING A WEBSITE

BACKGROUND

The specification relates to generating an overlay for sharing information on a website among users who are associated with a social network.

People frequently obtain the information that they need from the Internet. When people have a question, they seek an answer from a forum discussing a related subject, friends in their social networks, web searches, etc. However, each of these answer seeking procedures has disadvantages.

A forum is an online discussion site where people can hold conversations and provide information on a specific subject that they are interested in. A person asks a question in the forum and waits for others viewing the topic to respond to the question. However, there are at least two problems for a person obtaining information in this way. First, there is no control on whether and when others respond to the question. Second, it is hard to judge whether the responses from others are reliable.

As people become more and more socialized on the Internet, people tend to obtain information from contacts in their social networks. People and their contacts are connected because of friendship, family or other relationships. If the contacts know the answer to a question, their answers might be reliable. However, the contacts may not have pertinent information to answer the question.

People can also obtain information through a web search. However, if people need more information beyond the search result (e.g., the website), people have to leave the website to traverse the Internet for additional information.

SUMMARY

According to one innovative aspect of the subject matter described in this disclosure, a social network engine registers a first user with a social network and generating a user profile for the first user that includes topics, a rating engine receives user activities for the first user associated with the first website and at least a second website from at least a second user and generates a website rating for the first user based on user activities related to the first website and an overall rating for the first user based on user activities related to the first website and the other websites, a filter module determines that the website rating or the overall rating exceed a threshold value and a user interface module generates graphical data for displaying an overlay for the first website that includes information about the first user comprising a name of the first user, the overall rating and the website rating for the first website.

In general, another innovative aspect of the subject matter described in this disclosure may be embodied in methods that include registering a first user with a social network, generating a user profile for the first user that includes topics, receiving user activities for the first user associated with the first website and at least a second website from at least a second user, generating a website rating for the first user based on user activities related to the first website and an overall rating for the first user based on user activities related to the first website and over websites, determining that the website rating or the overall rating exceed a threshold value and generating graphical data for displaying an overlay for the first website that includes information about the first user comprising a name of the first user, the overall rating and the website rating for the first website. Other aspects include corresponding methods, systems, apparatus and computer program products.

These and other implementations may each optionally include one or more of the following features. For instance, the features further include the user activities being the second user's rating for the first user and the second user's rating is based at least in part on a bi-directional communication between the first user and the second user. The operations further include sharing an annotation created by the first user with a group on the social network. The operations further include sharing the user profile of the first user with the second user. The operations further include sharing the first website with the social network, wherein the first website is shared along with any annotations for the first website. The features further include the overlay having at least one of a forum for discussing the first website, a dialog box for discussing the first website and annotations of the first website. The features further include the overlay having annotations of the first website that are created by the first user and are stored as part of the user profile for the first user. The features further include the overlay having annotations of the first website that are shared based at least in part on a sharing level for the annotations. The features further include the overlay having information about all users that interacted with the first website. The operations further include receiving at least one condition from the first user, the condition relating to at least one of demographics and a topic, filtering the other users that are associated with the first website that satisfy the condition and updating the overlay to include the users that satisfy the condition. The operations further include recommending a website based at least in part on the user profile and providing a number of people that are active on the website. The operations further include creating a custom skin for the first website.

BRIEF DESCRIPTION OF THE DRAWINGS

The specification is illustrated by way of example, and not by way of limitation in the figures of the accompanying drawings in which like reference numerals are used to refer to similar elements.

FIG. 3 is a graphic representation of an example overlay associated with a website.

FIG. 7 is a graphic representation of another example updated overlay associated with a website.

FIG. 8 is a graphic representation of another example updated overlay associated with a website.

DETAILED DESCRIPTION

A system and methods for sharing information on a website among users who are associated with a social network are described below.

Figure 1:
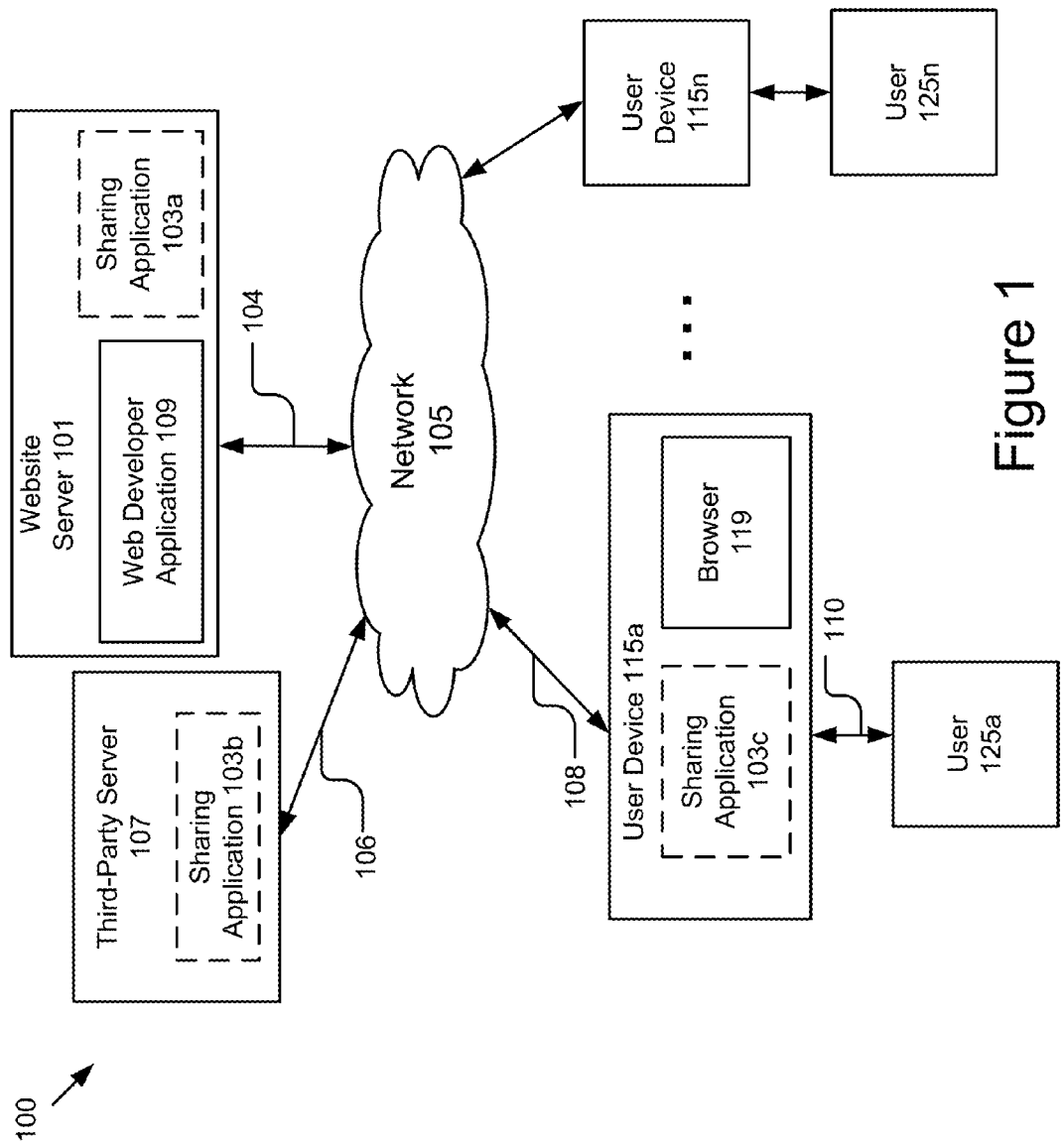
FIG. 1 is a high-level block diagram illustrating an example web sharing system.

FIG. 1 illustrates a block diagram of a system 100 for sharing and accessing a website according to one instance. The illustrated description of a system 100 for sharing a website includes user devices 115a, 115n that are accessed by users 125a, 125n, a website server 101 and a third-party server 107. In FIG. 1 and the remaining figures, a letter after a reference number, for example, "115a" is a reference to the element having that particular reference number. A reference number in the text without a following letter, for example, "115," is a general reference to any or all instances of the element bearing that reference number. In the illustrated instance, these entities are communicatively coupled via a network 105.

In one instance, the sharing application 103a is operable on the website server 101, which is coupled to the network 105 via signal line 104. The website server 101 also includes a web developer application 109 that generates content for a website. The sharing application 103a generates an overlay for the website, and the overlay is displayed on the website generated by the web developer application 109. The overlay includes at least one of a forum for discussing the website, a dialog box for discussing the website and annotations of the website. In one instance, the web developer application 109 is a component of the sharing application 103a.

In another instance, the sharing application 103b is stored on the third-party server 107, which is connected to the network 105 via signal line 106. The sharing application 103b communicates with the web developer application 109 via the network 105 to provide the overlay for incorporation into the website.

In yet another instance, the sharing application 103c is stored on the user device 115a, which is connected to the network 105 via signal line 108. The user 125a interacts with the user device 115a via signal line 110. Similarly, the user 125n interacts with the user device 115n. The user device 115a, 115n is any computing device that includes a memory (not shown) and a processor (not shown). For example, the user device 115a, 115n can be a computing device including a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. In some instances, the sharing application 103c is a thin-client application that is stored in part on the user device 115a and in part on the website server 101.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another instance, the network 105 may be a peer-to-peer network. The network 105 may also be coupled to or includes portions of a telecommunications network for sending data in a variety of different communication protocols. In yet another instance, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

The sharing application 103 generates an overlay for a website such that users who are associated with a social network can share and access information on the website. In one instance, the sharing application 103 registers a first user with the social network, rates the first user and generates the overlay for the website that includes information for the first user (e.g., name, ratings, etc.). The sharing application 103 also registers other users with the social network and updates the overlay to include information for the other users that is filtered according to a condition, such as demographic information. In one instance, the sharing application 103 is an embedded extension in a web product (e.g., a plug-in for a web browser, an application in a social network, etc.) that connects people by sharing a website.

Figure 2:
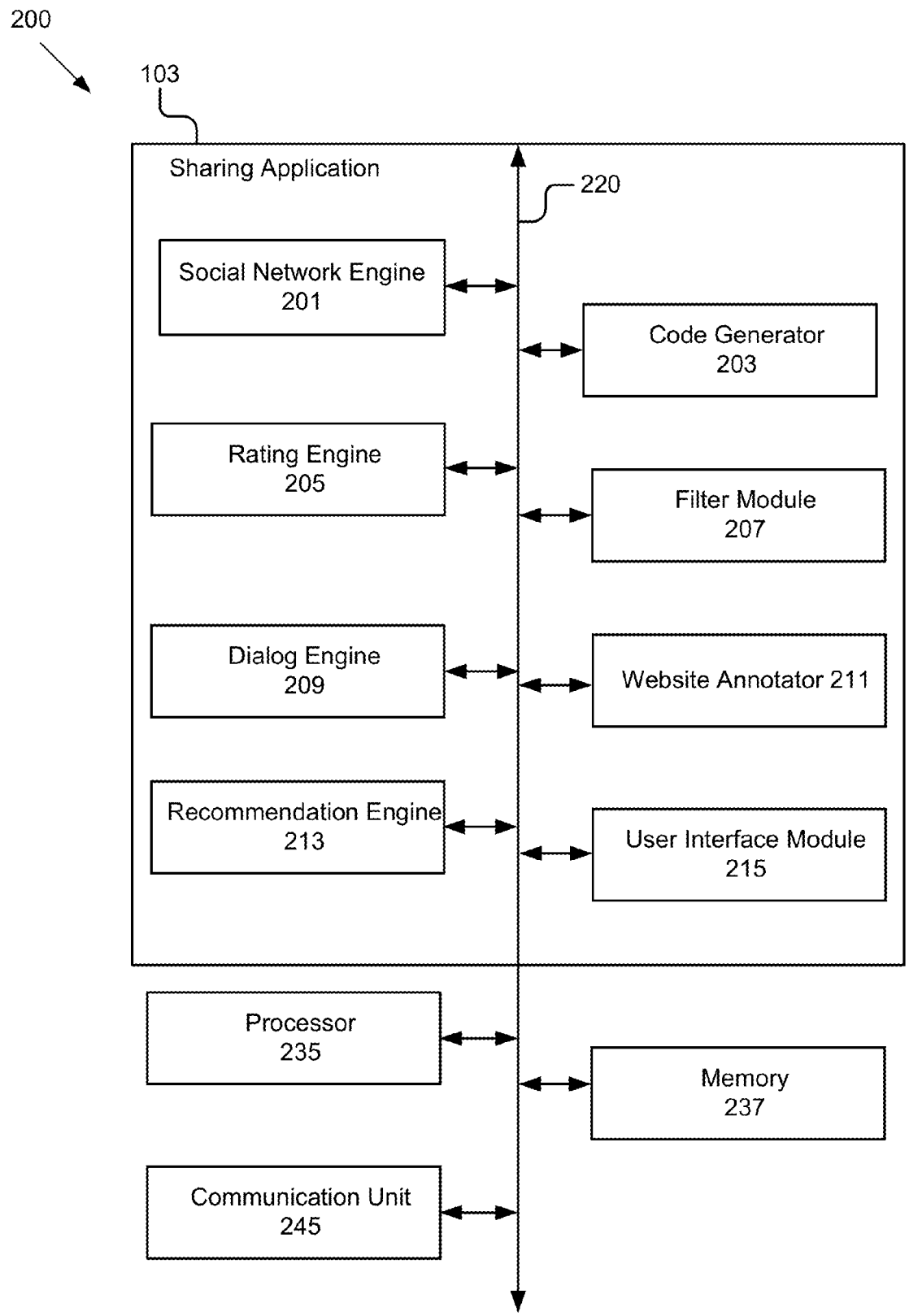
FIG. 2 is a block diagram illustrating an example sharing application.

Referring now to FIG. 2, the sharing application 103 is shown in more detail. FIG. 2 is a block diagram of a computing device 200 that includes the sharing application 103, a processor 235, memory 237 and a communication unit 245 that each communicate over the bus 220. In one instance, the computing device 200 is a website server 101. In another instance, the computing device 200 is a third-party server 107. In yet another instance, the computing device 200 is a user device 115a.

The processor 235 comprises an arithmetic logic unit, a microprocessor, a general purpose controller or some other processor array to perform computations, provide electronic display signals to a display device. The processor 235 is coupled to the bus 220 for communication with the other components. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components. The instructions and/or data may comprise code for performing any and/or all of the techniques described herein. The memory 237 may be a dynamic random access memory (DRAM) device, a static random access memory (SRAM) device, flash memory or some other memory device known in the art. In one instance, the memory 237 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis. The memory 237 includes profile information associated with users and the overlay associated with each website. In one instance, the memory 237 also includes information relating to the social network.

The communication unit 245 transmits and receives data (for example, user information, user instructions, etc.) to and from other devices and servers. In one instance, the communication unit 245 includes a port for direct physical connection to the user device 115, the website server 107 or to another communication channel. For example, the communication unit 245 includes a USB, SD, CAT-5 or similar port for wired communication with the user device 115. In another instance, the communication unit 245 includes a wireless transceiver for exchanging data with the a communication channel using one or more wireless communication methods, such as IEEE 802.11, IEEE 802.16, BLUETOOTH® or another suitable wireless communication method.

In yet another instance, the communication unit 245 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another instance, the communication unit 245 includes a wired port and a wireless transceiver. The communication unit 245 also provides other conventional connections to the network for distribution of files and/or media objects using standard network protocols such as TCP/IP, HTTP, HTTPS and SMTP as will be understood to those skilled in the art.

In some instances, the sharing application 103 comprises a social network engine 201, a code generator 203, a rating engine 205, a filter module 207, a dialog engine 209, a website annotator 211, a recommendation engine 213 and a user interface module 215.

The social network engine 201 is software including routines for generating a user profile for the user in a social network and managing the social network. In one instance, the social network engine 201 is a set of instructions executable by the processor 235 to provide the functionality described below for generating the user profile. In another instance, the social network engine 201 is stored in the memory 237 of the computing device 200 and is accessible and executable by the processor 235. In either instance, the social network engine 211 is adapted for cooperation and communication with the processor 235 and other components of the computing device 200.

In one instance, the social network engine 201 registers the user with the social network responsive to receiving an operation on a web browser that displays the website. For example, the user clicks a web sharing button associated with a website to register with the social network. The web sharing button can be a portion of an overlay in the website as depicted in FIGS. 3-8. In some instances, the social network engine 201 registers the user with the social network by the user indicating approval of the website. For example, the user registers with the social network to share the website by selecting an indication of approval for the website (e.g. like, dislike, thumbs up, thumbs down, etc.).

The social network engine 201 generates a user profile that includes any of the user's name (real life name, username, unique identifier, nickname, etc.), demographic information (e.g., language, residence), photos, the websites that the user is associated with, etc. In particular, the user profile includes topics that the user is interested in. For example, the user profile contains a list of websites that the user subscribes to. In one instance, the websites are also associated with at least one subject so that the social network engine 201 identifies the user's interests based on the websites that the user subscribes to. The topics are visible to other users because they provide an opportunity to chat with the user about the user's interests. When a website contains multiple webpages, the user social network engine 201 can also associate each individual webpage with a user. For example, when a website covers a variety of topics users find it more helpful to make annotations and communicate about specific webpages because it would be difficult to discuss multiple pages at once. As a result, the social network engine 201 associates a uniform resource locator (URL) or a permalink (e.g. a URL that points to a specific blog or forum) with a user profile.

In one instance, the social network engine 201 updates the user profile to include additional information comprising a rating for the user and a sharing level for annotations in response to communications with the rating engine 205 and the website annotator 211, respectively.

During registration, the social network engine 201 also generates a username and password for the user to login. The username can be the user's handle on the website or the user can choose a different name as a handle to maintain anonymity.

In one instance, the social network engine 201 generates a user profile for a user to share with other users. The other users are either users who have registered with the social network (e.g., all members of the website) or the public. In another instance, the social network engine 201 generates the user profile for the user to share with selected users. The social network engine 201 selects a group of other users based at least in part on information provided by the first user. For example, the social network engine 201 instructs the user interface module 215 to generate a user interface for receiving the user's input. The user interface includes a field for the first user to input names of other users or select the group of other users from pre-defined categories (e.g., friends, users below a certain age, etc.) to share his or her profile.

In some instances, the social network includes a group of users that are connected to share information on a website. The member of the website shares information on the website with other members. The social network engine 201 manages the posting of information on the website, for example, posts with text, photos, videos, check-ins, comments, etc. In some instances, the social network engine 201 generates a social graph to record the relationships between members. For example, when a first user follows a second user, the first user has a first-degree relationship with the second user. When the second user follows a third user that the first user does not follow, the first user has a third-degree relationship with the third user. These relationships can be one dimensional or bi-directional. In some instances, the social network engine 201 generates a knowledge graph that records a relationship between subjects in the social network.

The code generator 203 is software including routines for generating code for incorporating an overlay into a website. The overlay is displayed as part of a user interface generated by the user interface module 215. The overlay will be described in more detail below with reference to the dialog engine 209 and the website annotator 211. In one instance, the code generator 203 is a set of instructions executable by the processor 235 to provide the functionality described below for generating code for embedding the overlay. In another instance, the code generator 203 is stored in the memory 237 of the computing device 200 and is accessible and executable by the processor 235. In either instance, the code generator 203 is coupled to the bus for cooperation and communication with the processor 235, the user interface module 215, the communication unit 245, the dialog engine 209, the website annotator 211 and other components of the computing device. In one instance, the code generator 203 also communicates with the user interface module 215 to create a custom skin for a website.

In some instances, the code generator 203 generates the code in response to receiving a request from the user. The code generator 203 instructs the user interface module 215 to generate graphical data for displaying the code. In some instances, the user can personalize the code, for example, by selecting colors and a skin for the overlay. The code generator 203 generates the code to generate the overlay selected by the user. Examples of user customization are described in greater detail below with reference to the user interface module 215.

The rating engine 205 is software including routines for generating a rating for a user based at least in part on user activities. In one instance, the rating engine 205 is a set of instructions executable by the processor 235 to provide the functionality described below for rating a user. In another instance, the rating engine 205 is stored in the memory 237 of the computing device 200 and is accessible and executable by the processor 235. In either instance, the rating engine 205 is adapted for cooperation and communication with the processor 235 and other components of the computing device 200.

The rating engine 205 generates the rating for the user based at least in part on user activities. The user activities include, but are not limited to, acknowledgements of the user's activity on websites (e.g. approval or disapproval including ratings of interactions with other users via the dialog box) and acknowledgements of the annotations to websites (e.g. ratings from other users about whether the annotations are helpful). The rating engine 205 uses the user activities that relate to user's interaction with one or more websites to rate the user. In one instance, the rating engine 205 receives the user activities from an overlay generated by the dialog engine 209. For example, the rating engine 205 receives the user's activities from an overlay including a toolbar to allow the user to annotate a website. In another instance, the rating engine 205 receives the user activities from user data stored in the memory 237.

In one instance, the rating for the user includes an overall rating and a website rating for a first website. The overall rating for a first user is an overall assessment for the first user based at least in part on the first user's activities on a set of websites. In one instance, the set of websites include websites on which the first user has elected to share information with other users. In another instance, the set of websites are the websites listed in the first user's profile. The rating engine 205 receives the first user's activities relating to the set of websites to generate the overall rating for the first user. In one instance, the rating engine 205 categorizes the set of websites according to topics, rates the first user on each category, and generates the overall rating for the first user based at least in part on the ratings on each category. For example, the rating engine 205 uses a weighted average of ratings on different categories of websites as the overall rating for the first user. The website rating for the first website is a reflection of the first user's activities on the first website. The first website is the current website that the first user shares with other users based at least in part on an overlay generated for the first website. In one instance, the overall rating and the website rating are represented by percentages. The higher the percentage, the better the rating. Persons of ordinary skill in the art will recognize that the overall rating and the website rating can be represented in other scales.

In one instance, the rating engine 205 receives a set of ratings for the first user from other users and generates the rating for the first user based at least in part on the set of ratings. The other users are users who have registered to share information on the first website with the first user (e.g., the members of the first website). In one instance, a piece of bi-directional communication between the first user and the other users is needed for the other users rating the first user. For example, a second user from the group of other users rates the first user based at least in part on messages sent and received from the first user to the second user and from the second user to the first user. This ensures that the first user does not receive a poor rating from other users with whom the first user has not interacted, such as spammers or people with malicious intent.

The filter module 207 is software including routines for filtering users that are included in the overlay according to at least one condition. In some instances, the filter module 207 is a set of instructions executable by the processor 235 to provide the functionality described below for filtering a user. In another instance, the filter module 207 is stored in the memory 237 of the computing device 200 and is accessible and executable by the processor 235. In either instance, the filter module 207 is adapted for cooperation and communication with the processor 235 and other components of the computing device 200.

The filter module 207 receives at least one condition from a first user or according to a default setting that the filter module 207 uses to remove users from the overlay associated with a website. The conditions include demographic conditions, a topic, a rating level, etc. In some embodiments, the filter module 207 filters users that have a website rating or an overall rating that fall below a threshold value. For example, if the conditions show that the first user prefers users who are interested in wind power, live in California and have a 90% website rating level or above to share the first website, the filter module 207 filters the other users that are associated with the website to identify users who satisfy the three conditions and transmits instructions to the dialog engine 209 to generate an overlay that satisfies the conditions. In one instance, the conditions are stored in the first user's profile and presented as part of the user interface so that the user can apply the same filter in the future. In some instances, the filter module 207 applies a default filter to all users to improve the overall user experience by increasing the chances that the users do not engage in obnoxious behavior, for example, a user with a low overall rating is more likely to spam the other users.

The dialog engine 209 is software including routines for generating a dialog box that is used for instant messaging, exchanging of photos, video conferencing, a forum or any other means for users to communicate. In one instance, the dialog engine 209 is a set of instructions executable by the processor 235 to provide the functionality described below for generating the dialog box. In another instance, the dialog engine 209 is stored in the memory 237 of the computing device 200 and is accessible and executable by the processor 235. In either instance, the dialog engine 209 is adapted for cooperation and communication with the processor 235 and other components of the computing device 200. The dialog engine 209 generates a dialog box that is associated with each website so that users can chat about the website. For example, a user submits questions to the dialog box about the content of the website and other members of the website answer the question. In another example, the users have conversations about the website or the topic of the website and, in some instances, use the dialog as an opportunity to make a connection on the social network by becoming connected (e.g. become friends, are added to a group, etc.). In yet another instance, the dialog engine 209 generates a list of members of the website in the dialog box that are available to chat (subject to factors, such as whether users have indicated that their names can be visible as associated with the website) and users can communicate privately with a set number of members.

In one instance, the dialog engine 209 monitors the status of users associated with a website and transmits the status to the user interface module 215 for incorporation into the overlay. The status includes whether a user associated with a website is online (e.g. based on a time that the user was last active on the page, such as one minute, five minutes, etc.), active (e.g. based on a user that is more active, such as submitting a comment, annotation, chatting, etc. in the last 30 seconds, etc.), inactive, available, unavailable, etc.

The website annotator 211 is software including routines for annotating a website. In one instance, the website annotator 211 is a set of instructions executable by the processor 235 to provide the functionality described below for annotating the website. In another instance, the website annotator 211 is stored in the memory 237 of the computing device 200 and is accessible and executable by the processor 235. In either instance, the website annotator 211 is adapted for cooperation and communication with the processor 235 and other components of the computing device 200.

The website annotator 211 receives instructions from users to annotate a website via the user interface and associates the annotations with the website. The website annotator 211 instructs the user interface module 215 to include annotations in the overlay (including, for example, a summary of the number of annotations made to a website, the time when annotations were added, etc.). In another instance, the website annotator 211 associates an annotation with a region of the website, such as when a user is commenting on a particular piece of text or image on the website. In one instance, the website annotator 211 stores the annotations from a specific user with the user's profile.

The web annotator 211 manages a sharing level for the annotations based on instructions from the users or a default setting. In one instance, the web annotator 211 interacts with the social network engine 201 to update the user profile for users with sharing level information. The sharing level includes, but is not limited to, friends, people that the user has placed in a group on the social network, people with the same topics of interest, people that the user has had bi-directional communications with, other users that are members of the first website and the public. For example, the web annotator 211 determines members of a website that have permission to view the annotations according to the sharing level stored in a user's profile. In one instance, the web annotator 211 stores a single sharing level for all annotations made by the first user in the first user's profile. In another instance, the web annotator 211 stores distinct sharing levels for annotations of each website as specified by a user in the user's profile. For example, a user may be comfortable sharing all annotations with the public for a website with general content but may want to limit the number of people that view annotations for a more controversial website or a website with sensitive material. In yet another instance, the web annotator 211 stores distinct sharing levels for annotations on distinct categories of websites in the first user's profile. The websites are categorized according to topics. For example, the web annotator 211 stores a sharing level for annotations on each category of websites in the first user's profile, where the websites that the first user is interested in are divided into four categories: movies, music, computers and sports.

The recommendation engine 213 is software including routines for recommending a plurality of websites and providing information for the plurality of websites to a user. In one instance, the recommendation engine 213 is a set of instructions executable by the processor 235 to provide the functionality described below for recommending websites. In another instance, the recommendation engine 213 is stored in the memory 237 of the computing device 200 and is accessible and executable by the processor 235. In either instance, the recommendation engine 213 is adapted for cooperation and communication with the processor 235 and other components of the computing device 200.

The recommendation engine 213 recommends a plurality of websites, news articles and videos to a user based at least in part on the user profile. For example, the recommendation engine 213 recommends websites for hotel booking and car rentals because the user's profile indicates that the user is interested in a topic of travel. In one instance, the recommendation engine 213 also includes user's activities to recommend websites. For example, the recommendation engine 213 recommends a set of news websites because the browsing history of the first user shows that the first user watches online news every morning. Furthermore, the recommendation engine 213 provides information of the recommended websites to the first user, for example, the number of people that are active on a website. In some instances, the recommendation engine 213 recommends a website after the number of active people on the website exceeds a threshold, for example, five, 50 or 100 people.

The user interface module 215 is software including routines for generating graphical data for displaying a user interface that includes the overlay and annotations for each website. In one instance, the user interface module 215 is a set of instructions executable by the processor 235 to provide the functionality described below for generating the graphical data for displaying the user interface. In another instance, the user interface module 215 is stored in the memory 237 of the computing device 200 and is accessible and executable by the processor 235. In either instance, the user interface module 215 is adapted for cooperation and communication with the processor 235 and other components of the computing device 200.

The user interface module 215 receives instructions from the other engines and modules and an overlay for each website. Specifically, the user interface module 215 receives information about the number of users that are associated with each website, their sharing levels and their interactions on the social network (e.g. social graph information) from the social network engine 201. The user interface module 215 uses this information to generate graphical data for displaying the statistics, for example, how many people are associated with a website and how many comments they have made with reference to the website. The user interface module 215 receives code from the code generator 203 for displaying to a web developer that incorporates the overlay into their website. The user interface module 215 receives rating information about users from the rating engine 205. The user interface module 215 receives information about the number of users that are online, communications that users have had with other users and other information about user communications from the dialog engine 209. The user interface module 215 receives instructions for displaying user information from the filter module 207 after a user requests that the overlay be filtered according to conditions. The user interface module 215 receives instructions about how to display annotations and which users have permission to view annotations from the website annotator 211. The user interface module 215 receives instructions for displaying recommendations from the recommendation engine 213.

The user interface module 215 generates graphical data for displaying an overlay for each website and updates the overlay for the websites. The overlay is a self-contained object code block that is embedded into the website itself or displayed separately on top of the website, for example, through use of a browser plug-in. The overlay includes, but is not limited to, a toolbar for choosing options for how to interact with the website, a forum for discussing the website, a dialog box for discussing the website or annotations of the website. In one instance, the overlay includes information about all users that interacted with the website. In another instance, the overlay includes a button for a user to input a comment or annotation about the website. In some instances, the overlay includes information for users that are filtered according to the conditions specified by a first user. In some instances, user information in the overlay comprises a name of a user and a rating for the user including an overall rating and a website rating for the first website. In yet another instance, the overlay also includes other information related to the website. For example, the overlay includes a message box providing messages about sharing the first website such as the number of users having registered to share the first website.

In some instances, once the user interface module 215 generates the graphical data for displaying the overlay for the website, it is incorporated into a user interface. In some instances, the user interface module 215 generates the overlay separately from the website, for example, when the sharing application 103b is part of a third-party server 107 and the web developer application 109 is part of a website server 101. Examples of an overlay are described below with reference to FIGS. 3-8.

In some instances, the user interface module 215 generates graphical data for displaying a user interface including an overlay for a website. In another instance, the user interface module 215 generates a custom skin for the website. The user interface module 215 can generate graphical data for displaying the website with customized features, for example, titles, colors, etc. in response to a user's request. Furthermore, the user interface module 215 can generate graphical data for displaying the website that is created by the web developer application 109 of the website server 101 and a custom skin that is created by a third-party. In some instances, once a web developer is satisfied with the custom skin, the web developer requests the code for the custom skin, which the code generator 203 instructs the user interface module 215 to display so that the web developer incorporates the skin onto a website.

Figure 3:
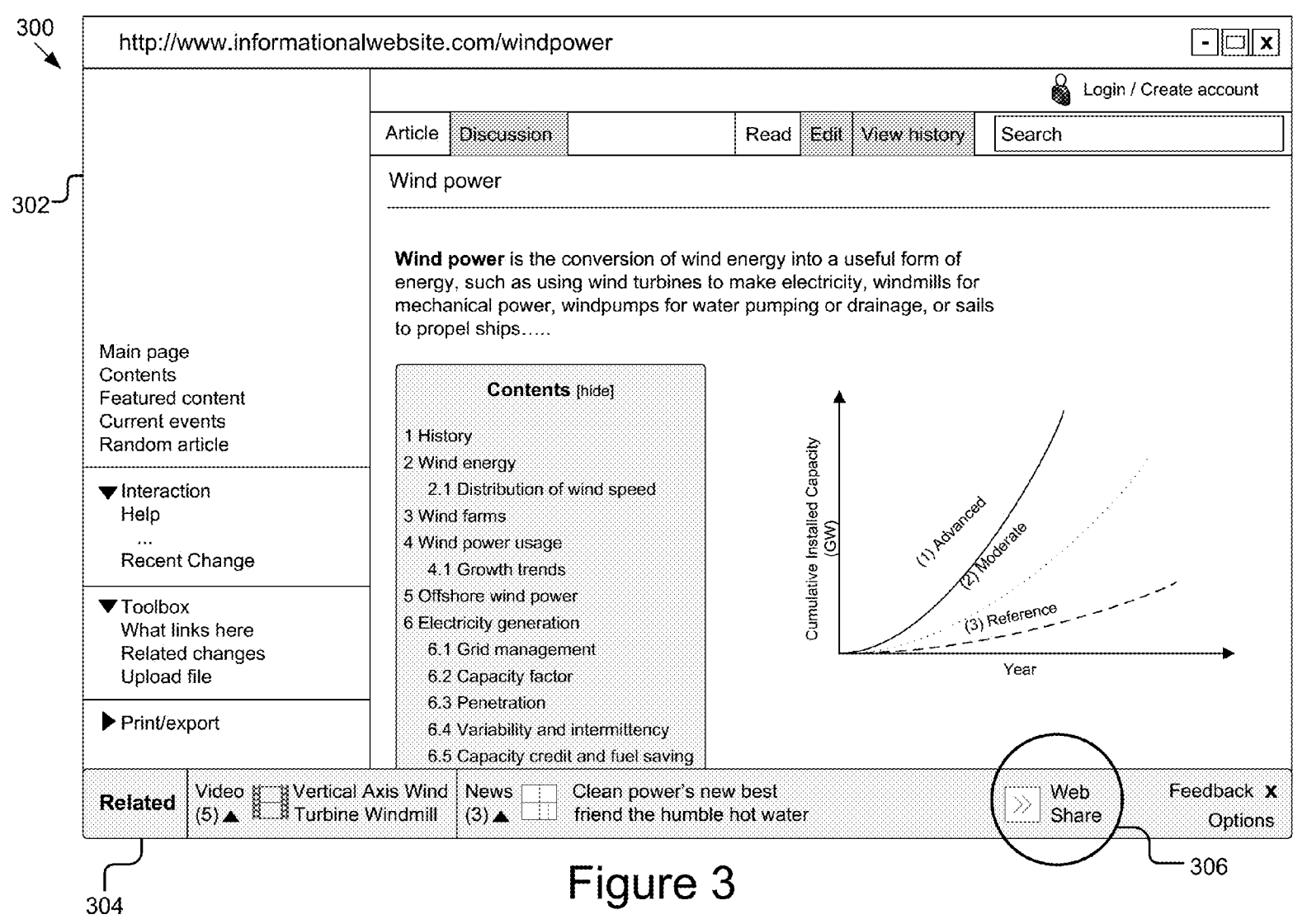

FIGS. 3-8 are examples of overlays. The various instances shown in FIGS. 3-8 are not sequential and any order of FIGS. 3-8 are possible. FIG. 3 is a graphic representation of a user interface 300 generated by the user interface module 215. In this example, the user interface 300 includes a window 302 displaying a webpage of a first website. The user interface 300 also includes an overlay 304 for the first website. The overlay 304 is a toolbar that is either incorporated into the webpage or displayed on top of the webpage, and is located at the bottom of the window 302. The overlay 304 includes a web sharing button 306. In one instance, clicking the web sharing button 306 causes the social network engine 201 to register a user with the website (if not previously registered) or a social network (if not previously registered) to share the information on the website with other members. In another instance, clicking the web sharing button 306 causes the user interface module 215 to generating an updated overlay. For example, the updated overlay is generated to include a pop-up menu that allows a user to interact with the website such as by annotating the first website.

Figure 4:
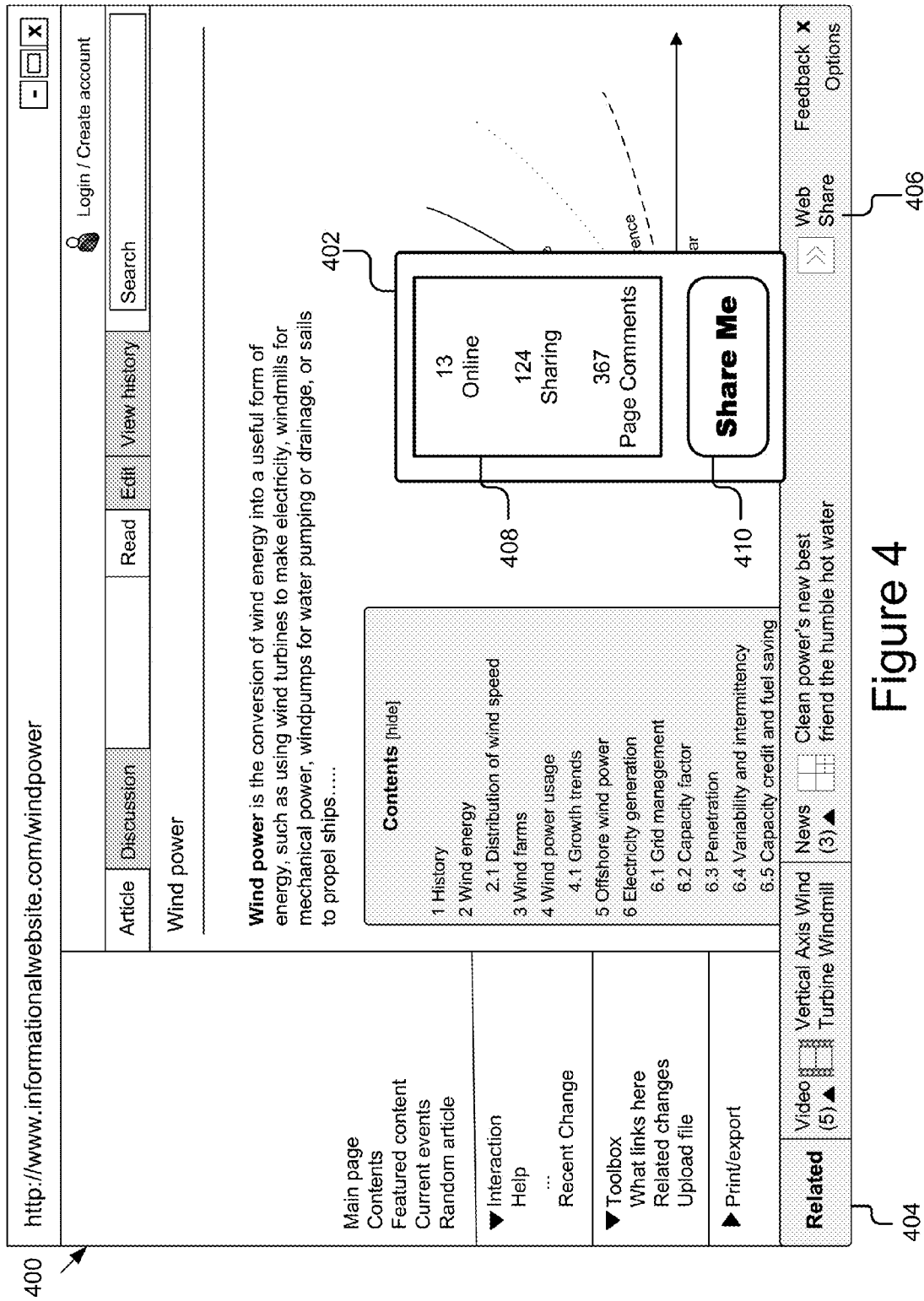
FIG. 4 is a graphic representation of an example of a first updated overlay associated with a website.

FIG. 4 is a graphic representation of a user interface 400 generated by the user interface module 215 that includes information received from the social network engine 201. In this example, the user interface 400 includes an overlay incorporated into the webpage of the first website. The first updated overlay includes the toolbar 404, the web sharing button 406 and a dialog box 402. The dialog box 402 includes a message box 408 and a share me button 410. The message box 408 provides messages about sharing the first website including a first number indicating how many users are online, a second number indicating how many users have shared the first website and a third number indicating how many users have commented on the first website. In one instance, clicking the share me button 410 causes a user to register with a social network to share the information on the first website with other users. In another instance, in response to the user clicking the share me button 410, the user interface module 215 generates an updated overlay.

Figure 5:
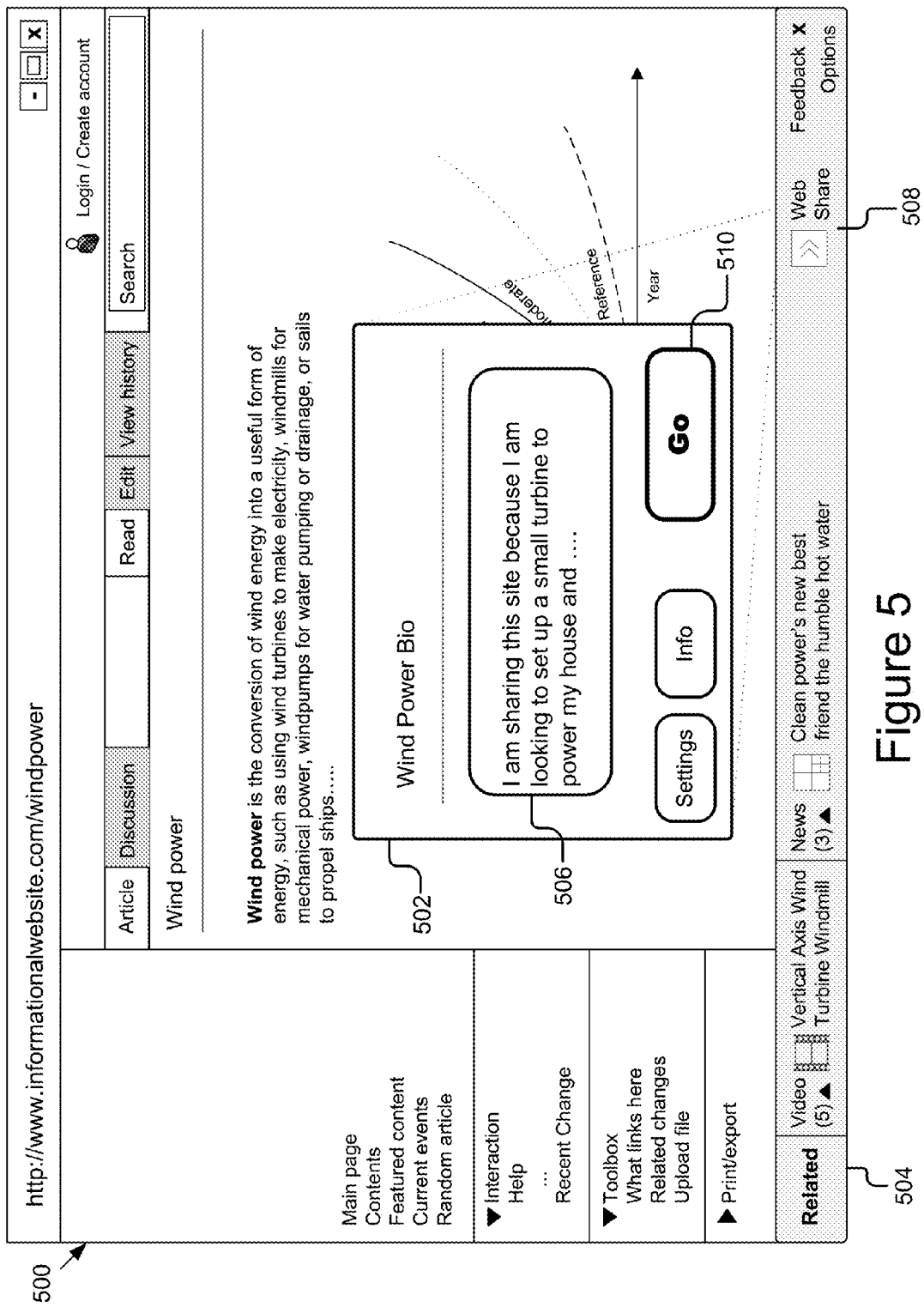
FIG. 5 is a graphic representation of an example updated overlay associated with a website.

FIG. 5 is a graphic representation of a user interface 500 generated by the user interface module 215. In this example, the user interface 500 includes an overlay with the toolbar 504, the web sharing button 508 and a dialog box 502. The dialog box 502 includes a message box 506 and a go button 510. The message box 506 allows a user to write message related to the first website, for example, a comment on the first website. Selecting the go button 510 causes another updated overlay to be generated.

Figure 6:
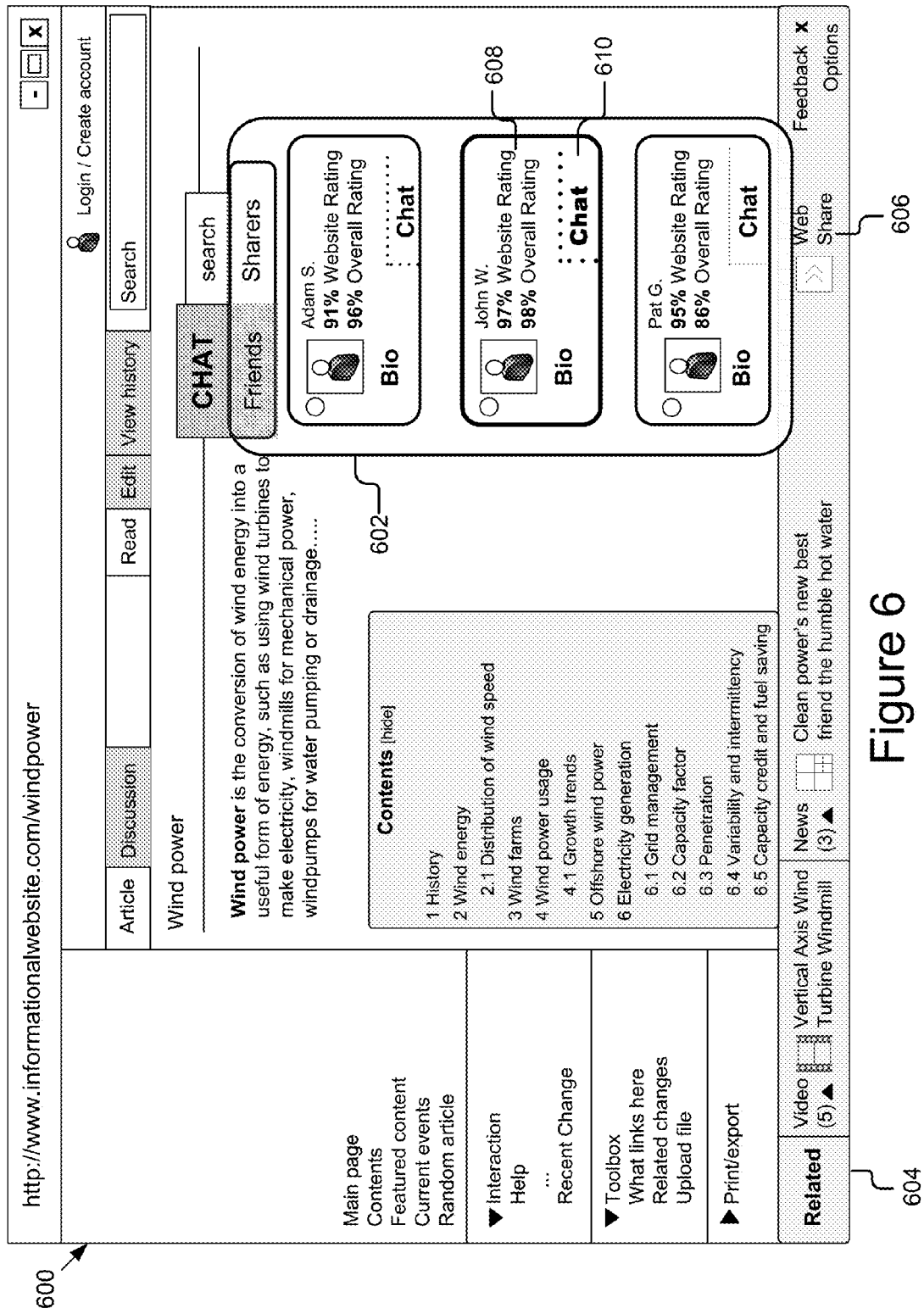
FIG. 6 is a graphic representation of another example updated overlay associated with a website.

FIG. 6 is a graphic representation of a user interface 600 generated by the user interface module 215. In this example, the user interface 600 includes an overlay with the toolbar 604, the web sharing button 606 and a dialog box 602. The dialog box 602 includes the results of user names after the filter module 207 applies conditions provided by a first user. The dialog box 602 is divided into several smaller dialog boxes including dialog box 608. The dialog box 608 includes information for a second user including a name, an overall rating, a website rating for the first website, a photo and other biographical information. Clicking a chat button 610 associated with the dialog box 608 causes the dialog engine 209 to instruct the user interface module 215 to display a chat box for the first user to chat with the second user.

FIG. 7 is a graphic representation of a user interface 700 generated by the user interface module 215. In this example, the user interface 700 includes an overlay with the toolbar 702, the web sharing button 704 and a dialog box 706. The dialog box 706 provides a window for a first user chatting with a second user. In addition to the second user's information such as a name, an overall rating and a website rating for the first website, the dialog box 706 includes a settings button 708. Selecting the settings button 708 causes a pop-up menu 710 to be generated. The pop-up menu 710 allows the first user to implement a variety of operations such as rating the second user, adding the second user to a second social network of the first user, annotating the first website, and viewing and editing the first user's profile. Persons of ordinary skill in the art will recognize that the pop-up menu 710 can include other options and operations.

Figure 8:
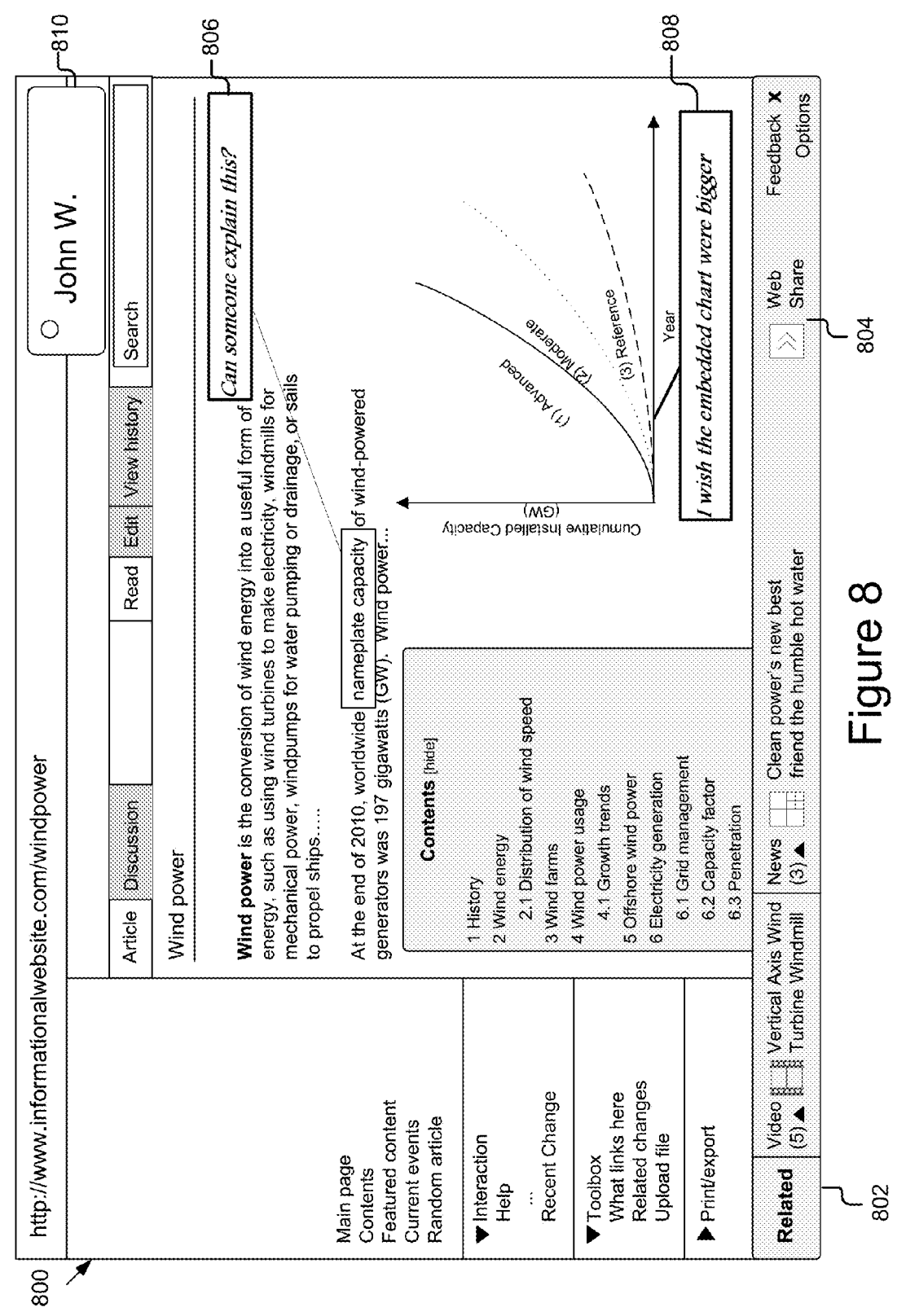

FIG. 8 is a graphic representation of a user interface 800 generated by the user interface module 215. In this example, the user interface 800 includes an overlay with the toolbar 802, the web sharing button 804 and annotations 806, 808. The annotations 806 and 808 are created by the first user and shared with the second user John W. indicated by 810.

Figure 9:
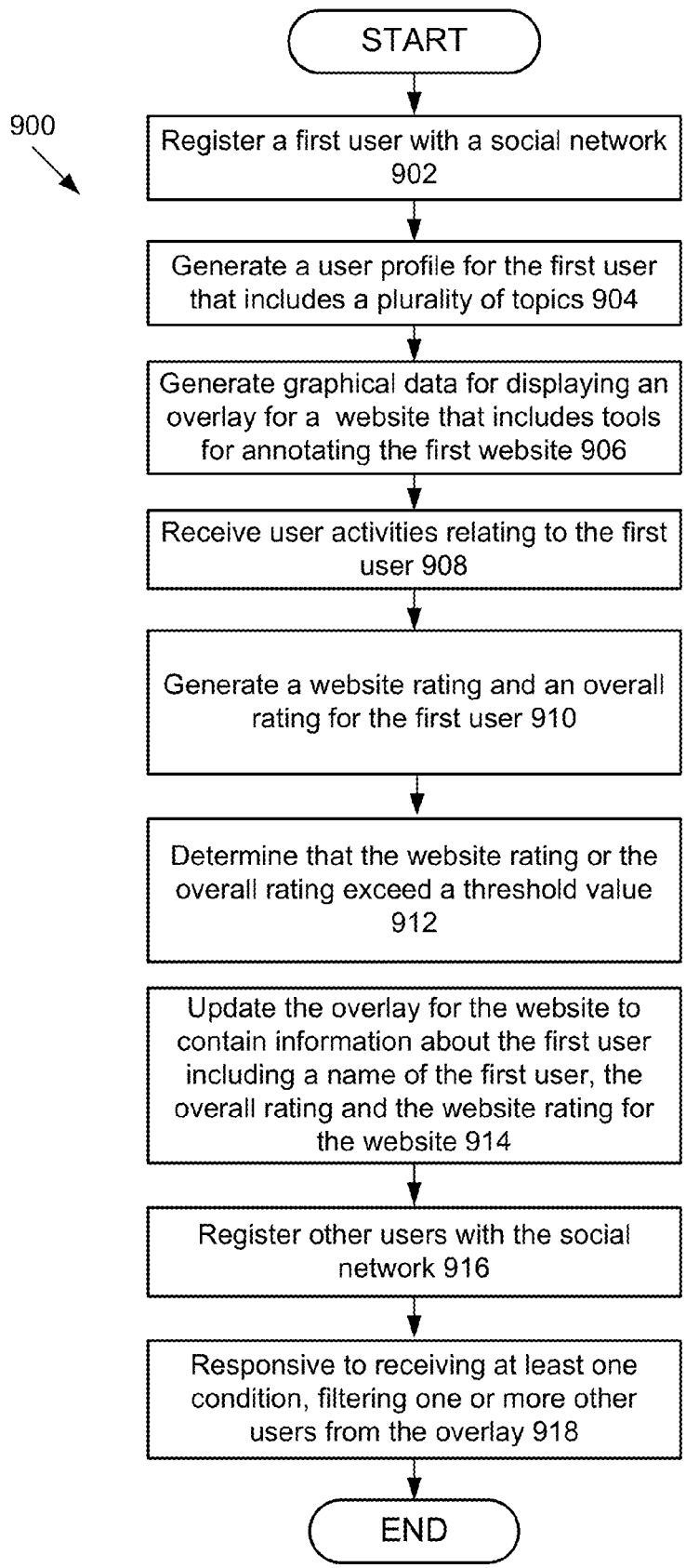
FIG. 9 is a flow diagram of one instance of a method for generating an overlay to enable users to share information on a website.
Figure 10:
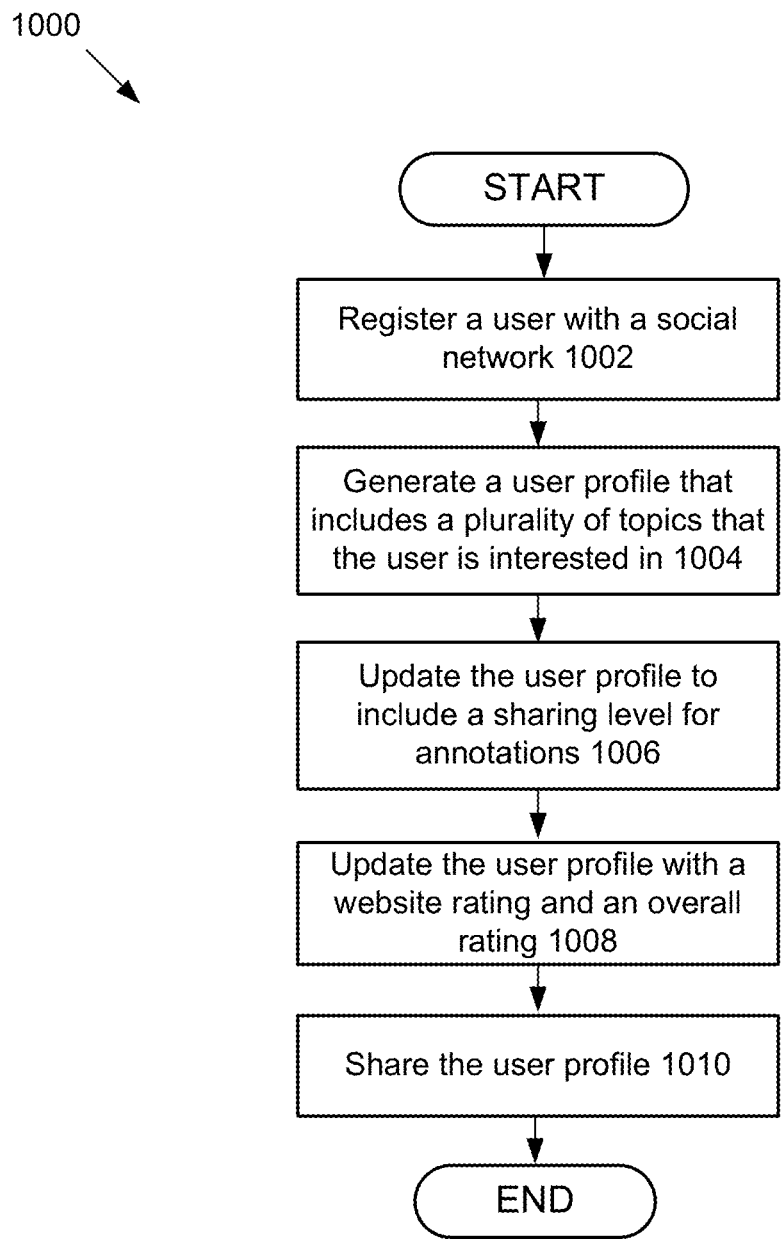
FIG. 10 is a flow diagram of an example method for sharing a user profile.
Figure 11:
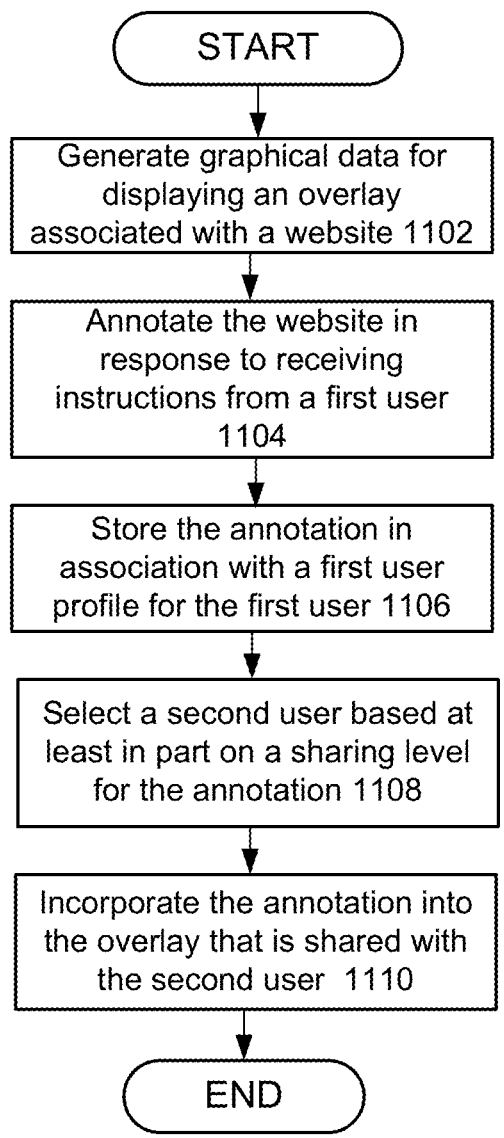
FIG. 11 is a flow diagram of an example method for sharing annotations associated with a website.

Referring now to FIGS. 9-11, various instances of the method of the specification will be described. FIG. 9 is a flow diagram 900 of an example method for generating graphical data for displaying an overlay to enable users to share information on a website. The social network engine 201 registers 902 a first user with a social network. The social network includes a group of users that are members of at least one website. The social network engine 201 generates 904 a user profile for the first user that includes a plurality of topics that the first user is interested in. In some instances the user specifies the topics of interest. In some instances, the user social network engine 201 receives a list of websites that the first user is associated with, identifies the topics for the website and adds the topics to the user's profile. Using the example in FIGS. 3-8, the user social network engine 201 determines that the first user is interested in wind power because the webpage is about wind power.

The user interface module 215 generates 906 graphical data for displaying an overlay for the website that includes tools for annotating the website. The rating engine 205 receives 908 user activities relating to the first user. The user activities include, but are not limited to, acknowledgements of the user's activity on websites (e.g. approval or disapproval including rating of interactions with other users via the dialog box) and acknowledgements of the annotations to websites (e.g. ratings from other users about whether the annotations are helpful). The rating engine 205 generates 910 a website rating and an overall rating for the first user. The website rating is based on user activities related to the website. The overall rating is based on user activities related to all websites. In some instances, the rating engine 205 rates the first user based on ratings from other users where the rating for the first user in association with the website is an average (median or means) of the ratings for the website and the overall rating is an average of the ratings for all websites. The filter module 207 determines 912 that the website rating or the overall rating exceed a threshold value. This is a precondition for displaying information about the first user in the overlay. If the website rating or the overall rating fell below the threshold value, the first user would be filtered out of the overlay.

The user interface module 215 updates 914 the overlay for the website to contain information about the first user, the overall rating and the website rating for the website. The social network engine 201 registers 916 other users with the social network. Responsive to receiving at least one condition from the first user or a default value, the filter module 207 filters 918 one or more other users from the overlay. The user interface engine 215 updates the overlay to include the one or more users that were filtered according to the at least one condition.

FIG. 10 is a flow diagram 1000 of an example method for sharing a user profile. The social network engine 201 registers 1002 a user with a social network such that the user can share information on a website with other users. In some instances, the social network engine 201 registers the user with the social network in response to the user requesting to join the social network. In some instances, the social network engine 201 registers the user with the social network in response to an indirect action, for example, the user indicating approval of the website. The social network engine 201 generates 1004 a user profile that includes a plurality of topics that the user is interested in. The user profile also includes the user's name, demographic information (e.g., language, location), photos, etc.

The social network engine 201 receives information from the web annotator 211 to update 1006 the user profile to include a sharing level for annotations. The web annotator 211 uses the sharing level for annotations to choose which users are permitted to view the annotations. The sharing level includes, but is not limited to, friends, people that the user has placed in a group on the social network, people with the same topics of interest, people that the user has had bi-directional communications with, other users that are members of the website and the public. For example, where a user is annotating a company website, the social network engine 201 generates a group in response to user instructions that includes other employees of the company and the sharing level is restricted to the employee group. This maintains privacy and helps create a working group where employees can discuss how to improve the company website.

The social network engine 201 receives information from the rating engine 205 and uses the information to update 1008 the user profile to include a rating of the user. The rating of the user includes a website rating and an overall rating. The website rating is an assessment for the user's activities on a specific website. The overall rating for the user is an overall assessment of the user based at least in part on the user's activities on a set of websites.

The social network engine 201 shares 1010 the user profile with other users. The other user could be all users or at least one selected user. All users are either users who have registered with the social network or the public. Selected users are a group of other users selected based at least in part on information provided by the user.

FIG. 11 is a flow diagram 1100 of an example method for sharing annotations associated with a website. The user interface module 215 generates 1102 an overlay associated with a website. The overlay takes many forms, for example, the overlay includes a toolbar for the user to annotate the website. The users who are members of the website share information using the overlay. The web annotator 211 annotates 1104 the website in response to receiving instructions from a first user. In one instance, the website annotator 211 receives the first user's instructions to annotate the website from the dialog box. The website annotator 211 then annotates the website according to the first user's instructions. In one instance, the web annotator 211 stores 1106 the annotation in the user profile for the first user.

The web annotator 211 allows the first user to choose which users to share the annotation with according to a sharing level for the annotations. In one instance, the sharing level is different for each website. The web annotator 211 selects 1108 a second user based at least in part on the sharing level for the annotation. The second user is a user that satisfies the user conditions defined in the sharing level for the annotation. The dialog engine 209 incorporates 1110 the annotation into the overlay.

In the above description, for purposes of explanation, numerous specific details are set forth in order to provide a thorough understanding of the specification. It will be apparent, however, to one skilled in the art that the specification can be practiced without these specific details. In other instances, structures and devices are shown in block diagram form in order to avoid obscuring the description. For example, the specification is described in one instance below with reference to user interfaces and particular hardware. However, the specification applies to any type of computing device that can receive data and commands, and any peripheral devices providing services.

Reference in the specification to "one instance" or "an instance" means that a particular feature, structure, or characteristic described in connection with the instance is included in at least one instance of the description. The appearances of the phrase "in one instance" in various places in the specification are not necessarily all referring to the same instance.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware instance, an entirely software instance or an instance containing both hardware and software elements. In a preferred instance, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the instances of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   registering, with one or more processors, a first user and a second user with a social network;
   receiving, with the one or more processors, user activities for the second user associated with the first website and a second website, the user activities being other users' ratings based on a bi-directional communication between another user and the second user;
   generating, with the one or more processors, a website rating for the second user based on the user activities related to the first website and an overall rating for the second user based on the user activities related to the first website and the second website;
   determining whether to include the second user in an overlay associated with the first website and displayed to the first user based on determining whether the website rating and the overall rating of the second user exceed a threshold value specified by the first user; and
   responsive to determining that the website rating and the overall rating of the second user exceed the threshold value, generating, with the one or more processors, graphical data for displaying the overlay for the first website that includes information about the second user to the first user, the overlay including a name, the overall rating and the website rating of the second user such that the first user can interact with the second user within the overlay.

2. The method of claim 1, further comprising sharing an annotation created by the first user with a group on the social network.

3. The method of claim 1, further comprising generating a user profile of the first user and sharing the user profile of the first user with the second user.

4. The method of claim 1, further comprising sharing the first website with the social network, wherein the first website is shared along with any annotations for the first web site.

5. The method of claim 1, wherein the overlay includes at least one of a forum for discussing the first website, a dialog box for discussing the first website and annotations of the first website.

6. The method of claim 1, wherein the overlay includes annotations of the first website that are created by the first user and are stored as part of a user profile for the first user.

7. The method of claim 1, wherein the overlay includes annotations of the first website that are shared based at least in part on a sharing level for the annotations.

8. The method of claim 1, wherein the overlay includes information about all users that interacted with the first website.

9. The method of claim 1, further comprising:
receiving one condition from the first user, the condition relating to one of demographics and a topic;
filtering other users that are associated with the first website that satisfy the condition; and
updating the overlay to include the other users that satisfy the condition.

10. The method of claim 1, further comprising:
recommending the first website based on a user profile of the first user; and
providing a number of people that are active on the first website.

11. The method of claim 1, further comprising creating a custom skin for the first website.

12. A system comprising:
one or more processors; and
a memory storing instructions that, when executed, cause the system to:
register a first user and a second user with a social network;
receive user activities for the second user associated with the first website and a second website, the user activities being other users' ratings based on a bi-directional communication between another user and the second user;
generate a website rating for the second user based on the user activities related to the first website and an overall rating for the second user based on the user activities related to the first website and the second website;
determine whether to include the second user in an overlay associated with the first website and displayed to the first user based on determining whether the website rating and the overall rating of the second user exceed a threshold value specified by the first user; and
responsive to determining that the website rating and the overall rating of the second user exceed the threshold value, generate graphical data for displaying for displaying the overlay for the first website that includes information about the second user to the first user, the overlay including a name, the overall rating and the website rating of the second user such that the first user can interact with the second user within the overlay.

13. The system of claim 12, wherein the system is further configured to share an annotation created by the first user with a group on the social network.

14. The system of claim 12, wherein the system is further configured to generate a user profile of the first user and share the user profile with the second user.

15. A computer program product comprising a non-transitory computer usable medium including a computer readable program, wherein the computer readable program when executed on a computer causes the computer to perform steps comprising:
registering a first user and a second user with a social network;
receiving user activities for the second user associated with the first website and a second website, the user activities being other users' ratings based on a bi-directional communication between another user and the second user;
generating a website rating for the second user based on the user activities related to the first website and an overall rating for the second user based on the user activities related to the first website and the second website;
determining whether to include the second user in an overlay associated with the first website and displayed to the first user based on determining whether the website rating and the overall rating of the second user exceed a threshold value specified by the first user; and
responsive to determining that the website rating and the overall rating of the second user exceed the threshold value, generating graphical data for displaying the overlay for the first website that includes information about the second user to the first user, the overlay including a name, the overall rating and the website rating of the second user such that the first user can interact with the second user within the overlay.

16. The computer program product of claim 15, wherein the computer readable program is further configured to share an annotation created by the first user with a group on the social network.

17. The computer program product of claim 15, wherein the computer readable program is further configured to generate a user profile of the first user and share the user profile with the second user.

* * * * *